United States Patent

Manseur et al.

[11] Patent Number: 5,485,156
[45] Date of Patent: Jan. 16, 1996

[54] ANTENNA STABILIZATION ERROR CORRECTION SYSTEM FOR RADAR

[75] Inventors: Arezki Manseur; William C. Weist, both of Boca Raton; Ruy L. Brandao, Fort Lauderdale; Phillip R. Hermann, Coral Springs, all of Fla.

[73] Assignee: AlliedSignal Inc., Morris Township, Morris County, N.J.

[21] Appl. No.: 310,117

[22] Filed: Sep. 21, 1994

[51] Int. Cl.$^6$ ........................ G01S 13/66
[52] U.S. Cl. .................................. 342/77
[58] Field of Search ............... 342/77, 75; 343/757

[56] References Cited

U.S. PATENT DOCUMENTS

| 3,821,738 | 6/1974 | Quesinberry et al. | 342/75 |
| 3,924,235 | 12/1975 | Heller et al. | 342/75 |
| 4,148,029 | 4/1979 | Quesinberry | 342/77 |

Primary Examiner—Ian J. Lobo
Attorney, Agent, or Firm—Howard G. Massung

[57] ABSTRACT

A radar utilizes an antenna stabilization error correction system to automatically estimate and correct attitude sensor errors in pitch, roll and elevation. The radar system includes an antenna, an antenna positioner, a transmitter receiver, a signal processor, an antenna controller and stabilization processor and the antenna stabilization error correction system. As part of the normal signal processor sub function, ground clutter signals are extracted from the received signals. These signals are the primary input to the antenna stabilization error correction system. Other inputs are received from the signal processor, antenna controller and stabilization processor and an external aircraft radio altimeter. The antenna stabilization error correction system processes the signals and estimates pitch, roll and elevation errors which are passed back to the antenna controller and stabilization processor.

8 Claims, 6 Drawing Sheets

BEGIN REGION FOR THIS SCAN POINTER
 INITIALIZE DATA SUM VECTOR (LENGTH = NUMBER OF RANGE BINS) TO ZERO.
 INITIALIZE DATA SUM COUNTER VECTOR TO ZERO.
 INITIALIZE MOTION DATA SUMS TO ZERO: HEADING, GROUND SPEED AND ALTITUDE.
 INITIALIZE CPI (COHERENT PROCESSING INTERVAL) COUNTER TO ZERO.
 STORE COMMANDED TILT ANGLE, $\Theta_{ct}$, FOR THIS SCAN POINTER AND THIS REGION.

FOR EACH CPI IN THIS REGION AND FOR THIS SCAN POINTER
 FOR EACH RANGE BIN (EACH ELEMENT OF DATA SUM VECTOR):
  IF S/N OF STATIONARY CLUTTER SIGNAL > MINIMUM S/N REQUIRED
   ADD RANGE SIGNAL POWER TO DATA SUM ELEMENT
   INCREMENT DATA SUM COUNTER ELEMENT.
 UPDATE MOTION DATA SUMS:
  HEADING SUM = HEADING SUM + CURRENT HEADING
  GROUND SPEED SUM = GROUND SPEED SUM + CURRENT GROUND SPEED
  ALTITUDE SUM = ALTITUDE SUM + CURRENT ALTITUDE.
 INCREMENT CPI COUNTER: CPIctr = CPIctr + 1.

END OF REGION FOR THIS SCAN POINTER
 COMPUTE AVERAGE HEADING, GROUND SPEED, ALTITUDE AND ELAPSED TIME:
  HEADING = (HEADING SUM)/CPIctr
  GROUND SPEED = (GROUND SPEED SUM)/CPIctr
  ALTITUDE = (ALTITUDE SUM)/CPIctr
  ELAPSED TIME = TIME SINCE LAST SCAN POINTER FOR THE REGION.
 FOR EACH RANGE BIN:
  IF DATA SUM COUNTER ELEMENT > MINIMUM DATA COUNT
   AVERAGE DATA ELEMENT = (DATA SUM ELEMENT)/(DATA SUM COUNTER ELEMENT)
  ELSE AVERAGE DATA ELEMENT = INVALID.
 SMOOTH AVERAGE DATA VECTOR BY DOWN-RANGE FILTERING WITH A SLIDING AVERAGER.
 COMPUTE RANGE CENTROID OVER VALID ELEMENTS OF SMOOTHED AVERAGE DATA VECTOR.
 IF MOTION CHANGE SINCE LAST SCAN, THIS REGION < MAXIMUM MOTION CHANGE ALLOWED
  MOTION COMPENSATE, USING ELAPSED TIME SINCE LAST SCAN, AVERAGE GROUND SPEED,
   AND AVERAGE HEADING CHANGE SINCE LAST SCAN, THE SMOOTHED AVERAGE DATA
   VECTOR FROM LAST SCAN POINTER INTO ALIGNMENT WITH THE SMOOTHED
    AVERAGE DATA
   VECTOR FOR THIS SCAN POINTER.
  MOTION COMPENSATE RANGE CENTROID FROM LAST SCAN POINTER.
  FOR EACH RANGE BIN, BEGINNING AT NEAREST RANGE CENTROID:
   IF VALID SMOOTHED AVERAGE DATA ELEMENTS EXIST IN BOTH THIS AND LAST SCAN
    COMPUTE $\Theta_e$ EQUATION (EQ6)
    INCREMENT VALID ELEMENT COUNT.
  IF VALID ELEMENT COUNT > MINIMUM VALID ELEMENTS REQUIRED:
   DECLARE $\Theta_e$ VALID FOR THIS REGION.

FIG. 6

COMPUTE INCREMENTAL COMPONENTS, $\Delta Pe$, $\Delta Re$, $\Delta Ee$ AND $\Delta T$:
$\Delta Re = (1/2)(\Theta elV - \Theta ell)$
$\Delta Ee = (1/2)(\Theta elV + \Theta ell)$
$\Delta Pe, = \Theta el - Ee$
$\Delta T$ = ELAPSED TIME SINCE LAST SCAN SLEW RATE LIMIT $\Delta Pe$, $\Delta Re$ AND $\Delta Ee$:
$-\Delta T$ (PITCH RATE LIMIT) $\leq \Delta Pe \leq \Delta T$ (PITCH RATE LIMIT)
$-\Delta T$ (ROLL RATE LIMIT) $\leq \Delta Re \leq \Delta T$ (ROLL RATE LIMIT)
$-\Delta T$ (ELEV RATE LIMIT) $\leq \Delta Ee \leq \Delta T$ (ELEV RATE LIMIT)

INTEGRATE $\Delta Pe$, $\Delta Re$ AND $\Delta Ee$ TO OBTAIN $Pe$, $Re$ AND $Ee$:
$Pe = Pe + \Delta Pe$
$Re = Re + \Delta Re$
$Ee = Ee + \Delta Ee$ MAGNITUDE LIMIT $Pe$, $Re$ AND $Ee$:
-PITCH LIMIT $\leq Pe \leq$ PITCH LIMIT
-ROLL LIMIT $\leq Re \leq$ ROLL LIMIT
-ELEV LIMIT $\leq Ee \leq$ ELEV LIMIT

FIG. 7

ANTENNA STABILIZATION ERROR CORRECTION SYSTEM FOR RADAR

BACKGROUND OF THE INVENTION

1. Field of the Invention

The present invention relates to radar antenna stabilization error correction and more particularly to the correction of attitude sensor errors as well as antenna beam elevation errors.

2. Description of the Prior Art

Airborne radar systems used to detect and annunciate flight hazards require means to accurately point the antenna beam with respect to the local earth reference. It is common practice in both air transport and general aviation radar systems to obtain aircraft attitude data, i.e. pitch and roll information, from an attitude reference sensor external to the radar system. Such an attitude sensor may be an inertial reference system, a vertical gyro, or a bank and pitch instrument containing a vertical gyro. Attitude sensors are known to exhibit both fixed and time varying errors which degrade antenna beam pointing accuracy; sensor errors of 2° to 3° are not uncommon with vertical gyro based instruments.

Antenna beam pointing is also effected by errors internal to the radar system, e.g. positioner calibration, mechanical versus electrical boresight alignment of the antenna, and droop in the positioner mechanism. In general, for normal aircraft maneuvers, these errors are independent of aircraft attitude. Internal errors are also independent of both small antenna elevation angles and azimuth angles. Elevation angle is the vertical angle orthogonal to, and measured from, the plane defined by the aircraft longitudinal and lateral axis to the boresight of the antenna beam. Azimuth angle is the horizontal angle measured in the plane defined by the aircraft longitudinal and lateral axis and measured from the aircraft longitudinal axis to the position of the antenna beam projected onto the measurement plane. The above mentioned internal errors are all manifested as beam elevation errors, and as such, will be referred to hereafter as elevation errors.

Current practice for radars used in the air transport and general aviation community is to provide the operator with a means for manual adjustment of radar antenna beam tilt. Such adjustment allows the operator to manually compensate for beam elevation errors and some attitude sensor errors. Some radar systems also provide separate means for manual adjustment for pitch trim and/or roll trim.

It is an object of the present invention to provide a system that automatically estimates and corrects attitude sensor errors in pitch and roll and antenna beam elevation errors.

SUMMARY OF THE INVENTION

The present invention is a radar system incorporating an Antenna Stabilization Error Correction System (ASECS) which automatically estimates and corrects attitude sensor errors in pitch and roll and antenna beam elevation errors. The radar system includes an antenna, an antenna positioner, a transmitter/receiver, a signal processor, an antenna controller and stabilization processor and the antenna stabilization error correction system. External interfaces to the radar system are the aircraft attitude sensor and the aircraft radio altimeter. In operation, signals from ground scatters are received by the antenna and passed through the transmitter/receiver to the signal processor. As part of the normal signal processor sub function, ground clutter signals are extracted from the received signals. These signals are the primary input to the ASECS. Other inputs to the ASECS are received from the signal processor, antenna controller and stabilization processor and the external aircraft radio altimeter. ASECS processes the signals and estimates pitch, roll and elevation errors which are passed back to the antenna controller and stabilization.

BRIEF DESCRIPTION OF THE DRAWINGS

FIG. 6 illustrates a flow diagram for region processing.

FIG. 7 illustrates the computation of pitch error, Pe, roll error, Re, and elevation error, Ee.

DETAILED DESCRIPTION OF THE INVENTION

Error estimation depends upon antenna beam geometry and clutter signal power estimates obtained from a multiplicity of clutter patches with small perturbations in beam tilt angle. As noted in the Background of the Invention, beam elevation angle is measured with respect to the plane defined by the longitudinal and lateral axis of the aircraft. The vertical angle of the antenna beam with respect to the local horizon is defined as the beam tilt angle. Tilt angle is a commanded input to the antenna stabilization system either from the radar operator or from a radar internal calculation. For a fixed antenna azimuth angle, the effect of elevation errors cannot be separated from the effect of attitude sensor errors. As such, the sum of elevation errors and attitude sensor errors resolved about the fixed antenna azimuth angle is defined as stabilization error.

Figure 1:
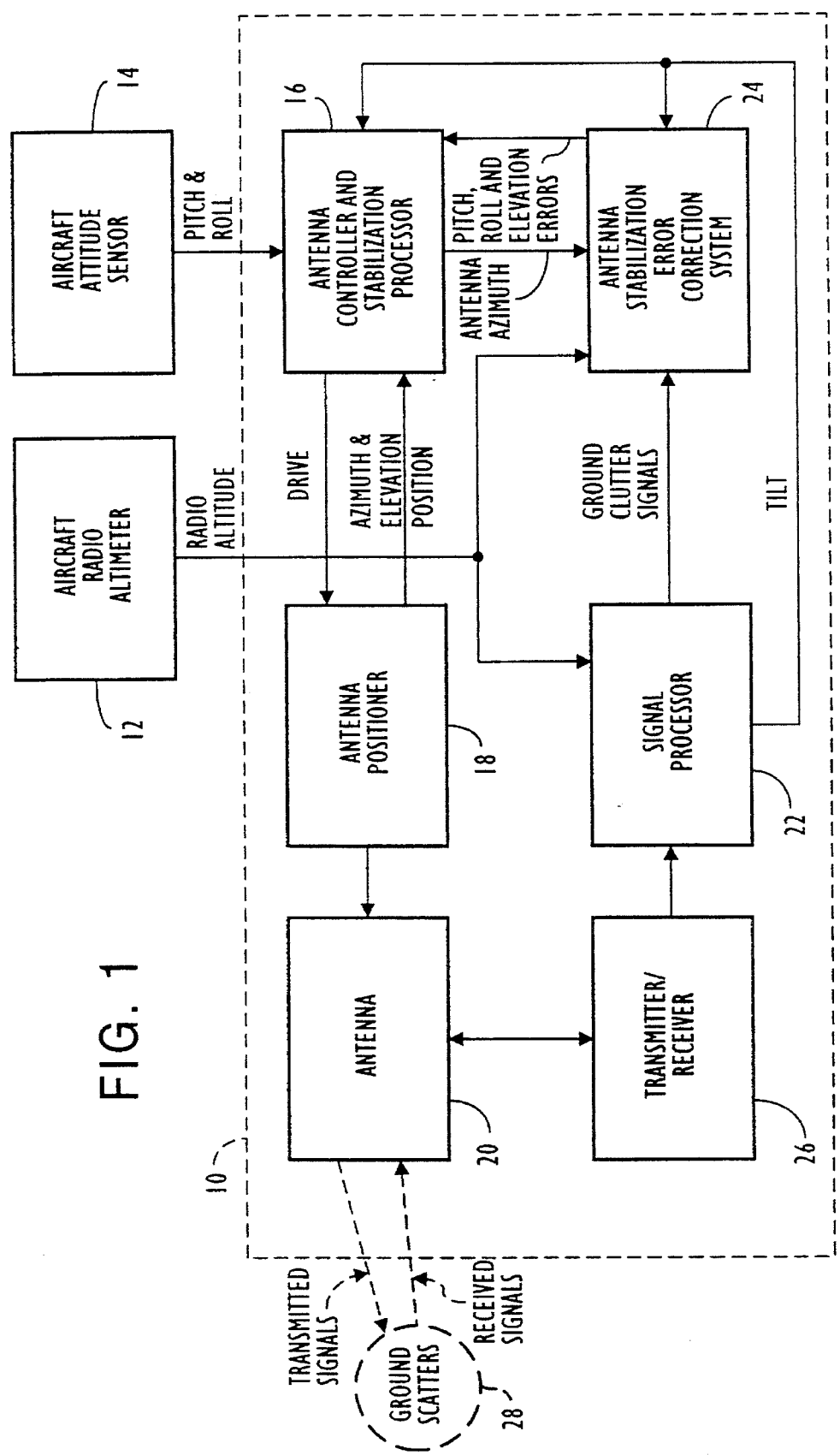
FIG. 1 illustrates a block diagram of the present invention.

FIG. 1 illustrates a block diagram of the present invention. Two aircraft sensors, external to the radar system 10, are also shown; aircraft radio altimeter 12 and aircraft attitude sensor 14. Within radar system 10 antenna controller and stabilization processor 16 provides the closed loop drive signals to antenna positioner 18. The loop maintains the azimuth and elevation positions of the antenna in agreement with desired azimuth and elevation positions computed from inputs to antenna controller and stabilization processor 16. These inputs are; command tilt angle, from signal processor 22, pitch and roll from aircraft attitude sensor 14 and the pitch (Pe), roll (Re) and elevation error (Ee) signals generated by ASECS 24. In this regard, for purposes of example, an antenna controller and stabilization processor such as 16 is shown and described in U.S. Pat. No. 4,148,029 issued on Apr. 3, 1979 to Quesinberry (element 19) and, for purposes of example, an antenna stabilization error correction system (ASECS) such as 24 is likewise shown and described in the Quesinberry patent (element 23). Though not shown, another input to antenna controller and stabilization processor 16 is commanded azimuth or commanded azimuth rate and azimuth limits. Antenna positioner 18 mechanically positions the beam axis of antenna 20 to the desired position.

Antenna 20 couples the electromagnetic energy from transmitter/receiver 26 to and from the radar observable environment. For purposes of ASECS 24, the environment is comprised of ground scatters 28. The signals received by transmitter/receiver 26 are passed to signal processor 22. As part of the normal signal processor sub function, ground clutter signals are extracted from the received signals. These signals are a primary input to ASECS 24. Other inputs to ASECS 24 are the commanded antenna tilt, antenna azimuth position and radio altitude as supplied by the external aircraft radio altimeter 12. ASECS 24 estimates pitch, roll and elevation errors which are passed back to antenna controller and stabilization processor 16.

Figure 2:
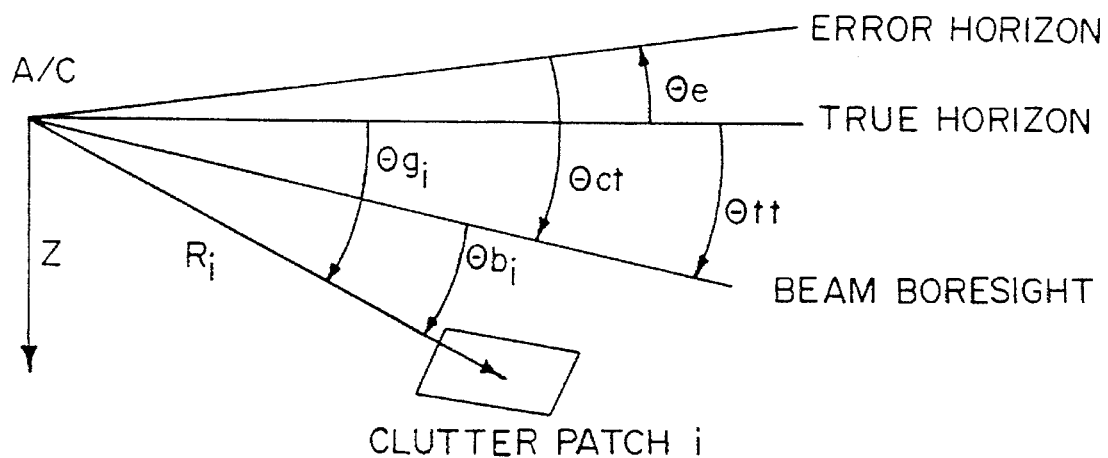
FIG. 2 illustrates the stabilization error geometry for a fixed azimuth.

FIG. 2 illustrates the Stabilization Error Geometry for a fixed azimuth. A right hand coordinate system is assumed such that the +X axis lies in the direction of the azimuth angle in the plane defined by true horizon, the +Y axis points out from the page, and the +Z axis points down as shown. In FIG. 2, positive angles are measured in a counterclockwise direction. Stabilization error, $\Theta e$, the desired output from the error estimation process is a positive angle. All other angles are depicted as negative.

Stabilization error, $\Theta e$, is defined as the angular displacement between the true horizon, which is parallel to the local earth, and the error horizon. The radar antenna stabilization system attempts to point the antenna beam boresight at an angle of $\Theta ct$, commanded tilt, with respect to the error horizon. If the system were error free, error horizon would coincide with the true horizon and $\Theta e$ would equal zero. By the geometry in FIG. 2:

$$\Theta tt = \Theta e + \Theta ct \quad (EQ1)$$

where $\Theta tt$ is the true tilt angle.

A second expression for $\Theta tt$ is:

$$\Theta tt = \Theta g_i / \Theta b_i \quad (EQ2)$$

where $\Theta g_i$ is the grazing angle and $\Theta b_i$ is the beam offset, angle and $$\text{where } \Theta g_i = \operatorname{asin}(-Z/R_i) \quad (EQ3)$$

where Z is the aircraft altitude AGL and $R_i$ is the slant range to clutter patch i and $$\text{where } \Theta b_i = 1/(2 \cdot K) \cdot \Delta dB_i / \Delta \Theta ct$$

Equation 3 is a commonly used form of the grazing angle equation, modified to indicate the grazing angle for clutter patch "i". Clutter is segregated into distinct patches by a range sampling process. Following each transmitted electromagnetic pulse, the received returns are sampled and quantized into individual range bins. Current practice in air transport windshear detection radars is to quantize received returns into range bins subtending a range of approximately ½ of a kilometer.

Figure 3:
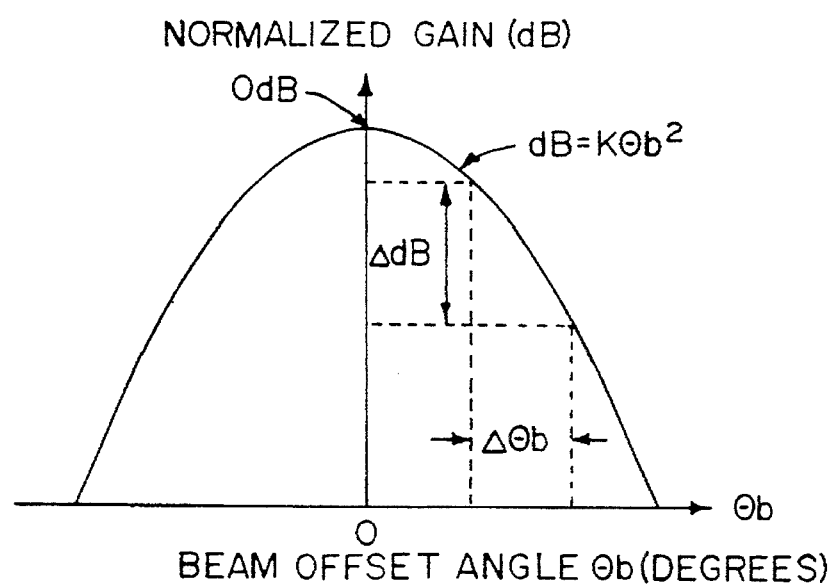
FIG. 3 illustrates main beam gain vs. offset angle approximation.

Equation 4 is derived from FIG. 3, Main Beam Gain vs. Offset Angle Approximation, by rearranging the derivative of the main beam gain vs. offset angle equation, $dB = K\Theta b^2$ and substituting $\Delta\Theta ct$ for $\Delta\Theta b$. The value of coefficient K is computed using known polynomial least squares regression methods. It is common practice to measure and plot one-way antenna elevation gain patterns as shown in FIG. 3 where normalized antenna gain in dBs is plotted as a function of the boresight offset angle in degrees. K is the quadratic coefficient of the least squares polynomial fitted to the one-way antenna elevation gain pattern of the particular antenna type used for the specific radar application. For a typical air transport x-band antenna exhibiting a one-way beam width of 3.3 degrees, K is equal to −2.3 dB/degree. Equation 4 relates estimated clutter power changes, $\Delta dB$, in a particular clutter patch "i" caused by a small perturbation in antenna tilt, $\Delta\Theta ct$, to the offset angle between the main beam boresight and the line of sight to the clutter patch.

The main beam gain approximation equation, $dB = K \Theta b^2$, is only valid for clutter patches sensed through the main lobe of the antenna. It is not valid for patches sensed through the sidelobe region of the antenna. As such the domain of equation 4 is restricted to offset angles within the main lobe of the antenna. Further restrictions on the domain of equation 4 are required to insure adequate main lobe to sidelobe clutter power ratios. $\Theta b$ is restricted to that portion of the main lobe where the normalized one way antenna gain is between 0 dB and −15 dB.

Equation 2 exploits two angular estimates, $\Theta g_i$ and $\Theta b_i$, obtained from a particular clutter patch "i" to estimate the true tilt angle, $\Theta tt$. In most clutter environments, multiple clutter patches are available, and thus equation 2 can be expressed as an average over a multiplicity of clutter patches. Including substitutions of equation 3 and equation 4, the expression for $\Theta tt$ obtained by averaging over multiple clutter patches is:

$$\Theta tt = 1/N \cdot \sum_{i=1}^{N} (\operatorname{asin}(-Z/R_i) - 1/(2 \cdot K) \cdot \Delta dB_i/\Delta\Theta ct) \quad (EQ\ 5)$$

where N is the number of qualified clutter patches. Equation 1 and equation 5 are combined to obtain the stabilization error expression embodied in the ASECS:

$$\Theta e = 1/N \cdot \sum_{i=1}^{N} (\operatorname{asin}(-Z/R_i) - 1/(2 \cdot K) \cdot \Delta dB_i/\Delta\Theta ct) - \overline{\Theta ct} \quad (EQ\ 6)$$

where $\overline{\Theta ct}$ is the average commanded tilt angle about which the tilt angle is perturbed.

A common practice for air transport and general aviation radar systems is to employ an antenna positioner capable of scanning the antenna in azimuth. Typical scan patterns are symmetrical about the longitudinal axis and subtend a span of +/−90°. For such radar systems, $\Theta e$ estimates can be obtained for a multiplicity of azimuth angles.

Figure 4:
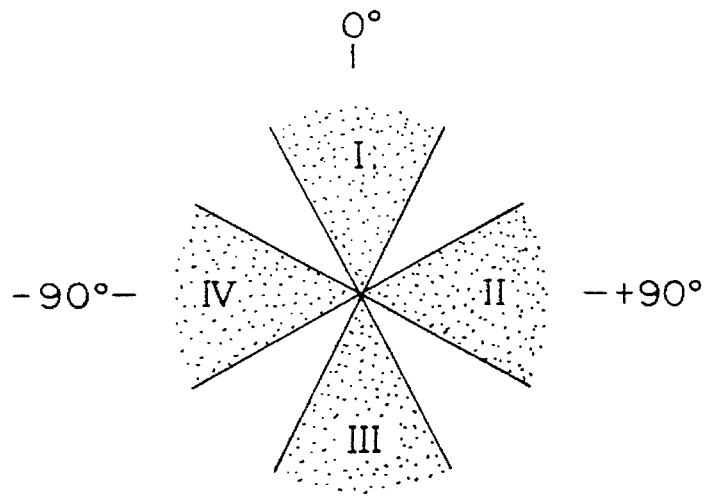
FIG. 4 illustrates azimuth scanning regions.

FIG. 4 diagrams Azimuth Scanning Regions useful for the ASECS process. Region I lies directly ahead of the aircraft, region II, centered at +90° azimuth lies along the right wing, region III lies directly behind the aircraft and region IV lies along the left wing. If valid $\Theta e$ estimates are obtained from at least three of the four regions, the error estimates can be resolved into pitch error, Pe, roll error, Re, and elevation error, Ee.

Figure 5:
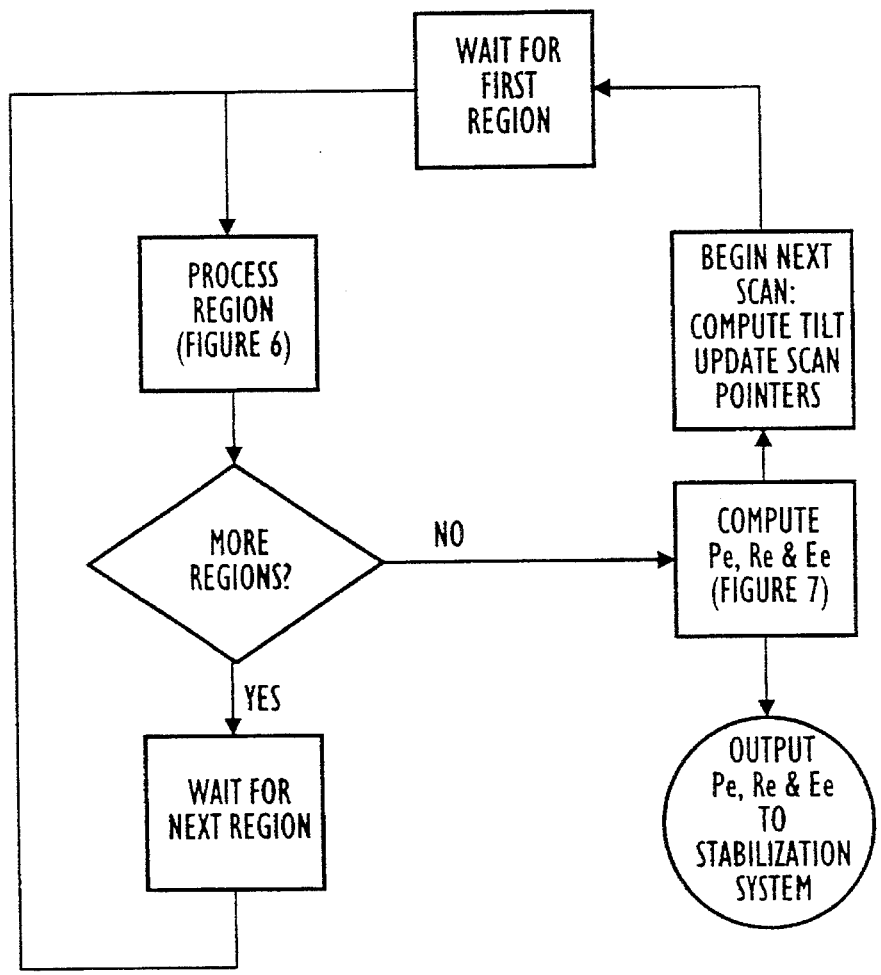
FIG. 5 illustrates an overall flow diagram of the error estimation process.

FIG. 5 is the Overall Flow Diagram of the Error Estimation Process. For each azimuth sweep available for $\Theta e$ estimation, a new value of $\Theta ct$ is computed. Actual commanded tilt values are dependent upon the intended radar function. Useful commanded tilt values for stabilization error estimation lie between +/−5° and are altitude dependent.

The preferred embodiment is to distribute the ASECS over a pair of azimuth scan sweeps with different commanded tilts used in each sweep. The difference in commanded tilt angles between the two sweeps in each sweep pair produces the small tilt perturbation, $\Delta\Theta ct$. Such perturbations are typically 1 to 2 degrees for x-band air transport radars. Smaller perturbation angles will introduce instabilities in the estimation process by way of equation 4. Larger perturbation angles will push $\Theta b$ outside the valid domain of the main beam gain approximation equation.

The data collected and processed in each sweep is assigned a distinct scan pointer to insure data isolation between sweeps. During a scan sweep, each region is processed as it is scanned by the moving antenna. Detailed processing flow for each region is shown in FIG. 6, Flow Diagram for Region Processing.

A few data qualification rules are included in FIG. 6. These rules discriminate against ill conditioned data. Typical values for some of the rule qualifiers are:

| Minimum S/N Required | 20 dB |
|---|---|
| Minimum Data Count | 15 |
| Minimum Valid Elements | 10 |

A typical value for maximum motion change allowed is application specific; it depends upon the angular extent and range extent of each region. The intent of this qualifier is to insure that the data collected in each sweep of a sweep pair are spatially correlated (overlapped) at least 85%. As such, for regions subtending 12 km in range and 60 degrees in azimuth, motion compensation is deemed valid for range changes of less than or equal to 1.8 km and heading changes of less than or equal to 9 degrees.

The means for resolving $\Theta e$ estimates, collected in three regions, into Pe, Re and Ee components is shown in flow diagram form in FIG. 7, Compute Pe, Re and Ee. Note, the stabilization error estimates in FIG. 7 are tagged with region identifiers, e.g. $\Theta$ eIII is the stabilization error in region III. If $\Theta e$ estimates are available from all four regions depicted in FIG. 4, the incremental pitch error $\Delta Pe$, acremental all error $\Delta Re$ and incremental elevation error $\Delta Ee$ components are evaluated as follows:

Slew Rate Limits on the incremental components, $\Delta Pe$, $\Delta Re$ and $\Delta Ee$ provide output dampening and match the time behavior of the ASECA to the time behaviors of the attitude sensor and antenna elevation positioning system. Typical slew rates for vertical gyro attitude sensor errors, pitch and roll, are no more than 2.5 degrees per minute. As such, 2.5 degrees per minute is a useful slew rate limit for $\Delta Pe$ and $\Delta Re$.

The slew rate limit for Ee depends upon expected maximum errors in the elevation positioner system and assumptions on time available to compute and correct Ee. For typical air transport takeoff procedures the available time is less than one minute. Elevation errors inherently depend upon specific radar equipment characteristics, however, current practice for air transport radars limits such errors to less than 0.5 degree. A desirable characteristic of the ASECS is rapid response, as such, the recommended slew rate limit is 1 degree per minute.

Magnitude Limits on the integrated error components, Pe, Re and Ee provide output bounding. Magnitude limits are also matched to the underlying errors. Typical magnitude limits for vertical gyro attitude sensor errors are +/–3.5 degrees in pitch and roll. As previously noted, the expected elevation error is less than 0.5 degree, a useful value for an Ee magnitude limit.

Means for error correction are application specific and depend upon system architecture details. One means for attitude sensor error correction is to add Pe and Re directly to the pitch and roll inputs from the attitude sensor. Another means is to transform Pe and Re as vectors using commonly known line of sight stabilization transformations into a second elevation error component different from Ee. This second elevation error is then added to Ee and the resulting sum applied to the elevation positioning mechanism. One means for applying elevation error correction, either Ee or Ee plus a Pe and Re derived component, to the elevation positioning mechanism is to add the elevation error to the elevation sensor output. Such sensor may be a synchro shaft angle encoder or an optical shaft angle encoder attached directly to the antenna elevation axis or coupled to the axis via gears. Another means for applying elevation error correction is to subtract the error from the desired elevation angle. The desired elevation angle is the angle computed by transforming the commanded tilt angle using the previously mentioned line of sight stabilization transformation.

Figure 8:
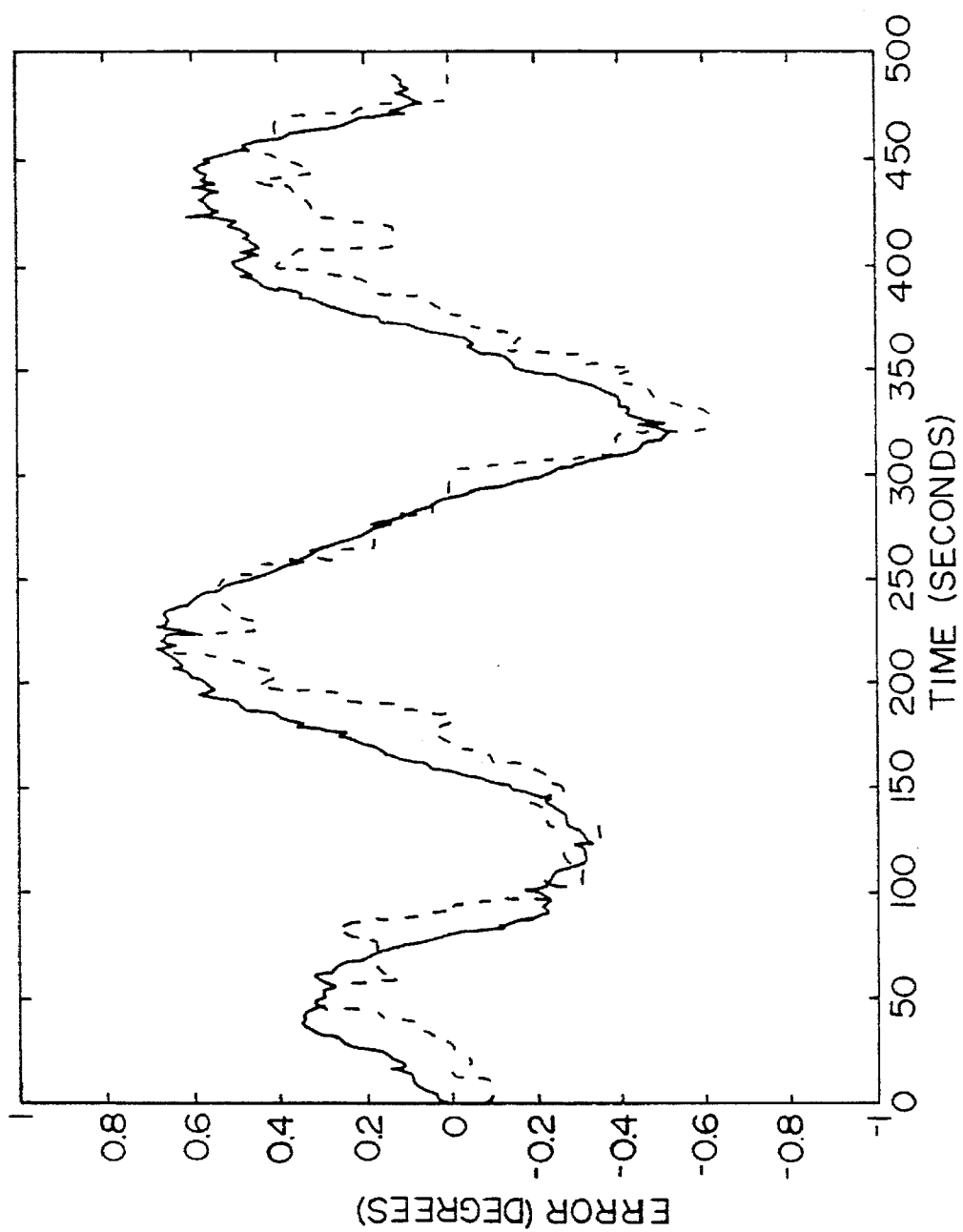
FIG. 8 illustrates measured gyro error and estimated error vs. time.

FIG. 8, Measured Gyro Error and Estimated Error vs Time shows the results of applying the ASECS to a radar system connected to a vertical gyro attitude sensor. The data shown in FIG. 8 was collected in a shallow 720° turn. By inspection, it is seen that the ASECS output closely matches the vertical gyro error. The residual, or uncorrected attitude gyro error, was less than 0.1° rms.

Stability tests of the ASECS were conducted using a inertial attitude sensor as a source of known good pitch and roll inputs to the radar stabilization system. With known good inputs and a stable algorithm, the expected ASECS attitude error outputs should be zero. The stability tests covered a matrix of clutter environments, aircraft maneuvers and antenna beam characteristics. Three clutter environments were investigated; rural, urban and sea. Four aircraft maneuvers were tested; level flight, takeoffs, landings and turns. Two different antenna beam characteristics tried. The average standard deviation of the ASECS attitude sensor error output for the entire testing matrix was less than 0.1° rms.

It is not intended that this invention be limited to the hardware arrangement or operational procedures shown disclosed, This invention includes all of the alterations and variations thereto as encompassed within the scope of the claims as follows.

We claim:

1. A radar system comprising:

antenna controller and stabilization processor means connected to an aircraft attitude sensor;

antenna positioner means connected to said antenna controller and stabilization processor means;

antenna means connected to said antenna positioner means for transmitting signals, for receiving signals and for receiving ground clutter;

transmitter/receiver means connected to said antenna means;

signal processor means connected to said transmitter/receiver means, said antenna controller and stabilization processor means and an aircraft radio altimeter;

antenna stabilization error correction system connected to said signal processor means, said antenna controller and stabilization processor means and said aircraft radio altimeter means, wherein said antenna stabilization error correction system estimates pitch, roll and elevation errors and transmits corrected signals to said antenna controller and stabilization processor means;

said antenna stabilization error correction system includes compute incremental component means for computing $\Delta Pe$, $\Delta R$, $\Delta Ee$ and $\Delta T$, wherein Pe is pitch error, Re is roll error, Ee is elevational error and T is time, compute slew rate limit means connected to said compute incremental component means, integrate means connected to said compute slew rate limit means for integrating $\Delta Pe$, $\Delta Re$, $\Delta Ee$ and for providing Pe, Re, Ee, and magnitude limit means connected to said integrate means; and said signal processor means extracting ground clutter signals from signals received from said transmitter/receiver means and sending said ground clutter signals to said antenna stabilization error correction system.

2. A radar system as claimed in claim 1 wherein said antenna controller and stabilization processor means provides closed loop drive signals to said antenna positioner means and said closed loop drive signals maintain azimuth and elevation positions of said antenna means that are consistent with desired azimuth and elevation positions computed from inputs to said antenna controller and stabilization processor means.

3. A radar system as claimed in claim 2 wherein said inputs to said antenna controller and stabilization processor means are command tilt angle from said signal processor means, pitch and roll from said aircraft attitude sensor and pitch, roll and elevation errors generated by said antenna stabilization error correction system.

4. A radar system as claimed in claim 3 wherein said antenna positioner means mechanically positions beam axis of said antenna means.

5. A radar system as claimed in claim 4 wherein said antenna means couples electromagnetic energy from said transmitter/receiver means to and from an observed object.

6. A radar system comprising:

antenna controller and stabilization processor means connected to an aircraft attitude sensor;

antenna positioner means connected to said antenna controller and stabilization processor means;

antenna means connected to said antenna positioner means for transmitting signals, for receiving signals and for receiving ground clutter;

transmitter/receiver means connected to said antenna means;

signal processor means connected to said transmitter/receiver means, said antenna controller and stabilization processor means and an aircraft radio altimeter; and, antenna stabilization error correction system connected to said signal processor means, said antenna controller and stabilization processor means and said aircraft radio altimeter means, wherein said signal processor means extracts ground clutter signals from signals received from said transmitter/receiver means and sends said ground clutter signals to said antenna stabilization error correction system and wherein said antenna stabilization error correction system estimates stabilization error, $\Theta e$, wherein $$\Theta e = 1/N \cdot \sum_{i=1}^{N} (a\sin(-Z/R_i) - 1/(2 \cdot K) \cdot \Delta dB_i/\Delta\Theta ct) - \overline{\Theta ct}$$

where N is number of qualified clutter patches;

where Z is aircraft altitude;

where $R_i$ is slant range to clutter patch i;

where K is dependent upon said antenna means specific to said radar system application;

where $\Delta dB_i$ is estimated clutter power changes in a particular clutter patch i;

where $\Delta\Theta ct$ is a small perturbation in antenna tilt; and, where $\Theta ct$ is average commanded tilt angle about which tilt angle is perturbed.

7. A radar system as claimed in claim 6 wherein said antenna stabilization error correction system comprises:

compute incremental component means for computing $\Delta Pe$, $\Delta Re$, $\Delta Ee$, and $\Delta T$, wherein Pe is pitch error, Re is roll error, Ee is elevation error and T is time;

computer slew rate limit means connected to said compute incremental component means;

integrate means connected to said compute slew rate limit means for integrating $\Delta Pe$, $\Delta Re$, $\Delta Ee$, and for providing Pe, Re and Ee; and magnitude limit means connected to said integrate means.

8. A radar system comprising:

antenna controller and stabilization processor means connected to an aircraft attitude sensor;

antenna positioner means connected to said antenna controller and stabilization processor means;

antenna means connected to said antenna positioner means for transmitting signals, for receiving signals and for receiving ground clutter;

transmitter/receiver means connected to said antenna means;

signal processor means connected to said transmitter/receiver means, said antenna controller and stabilization processor means and an aircraft radio altimeter;

antenna stabilization error correction system connected to said signal processor means, said antenna controller and stabilization processor means and said aircraft radio altimeter means, wherein said antenna stabilization error correction system estimates pitch, roll and elevation errors and transmits corrected signals to said antenna controller and stabilization processor means;

said antenna stabilization error system estimates stabilization error, $\Theta e$, wherein $$\Theta e = 1/N \sum_{i=1}^{N} (a\sin(-Z/R_i) - 1/(2\,K) \cdot \Delta dB_i/\Delta\Theta ct) - \overline{\Theta ct}$$

Where N is number of qualified clutter patches;

where Z is aircraft altitude;

where $R_i$ is slant range to clutter patch i;

where K is dependent upon said antenna means specific to said radar system application;

where $\Delta dB_i$ is estimated clutter power changes in a particular clutter patch i;

where $\Delta\Theta ct$ is a small perturbation in antenna tilt; and, where $\Theta ct$ is average commanded tilt angle about which tilt angle is perturbed.

* * * * *